United States Patent [19]

Heintzelman et al.

[11] Patent Number: 4,508,637

[45] Date of Patent: Apr. 2, 1985

[54] MIXTURES OF ALKYL AND ALKENYL SUCCINIC ACIDS AND POLYMER ACIDS

[75] Inventors: William J. Heintzelman; Richard L. Godar, both of St. Louis, Mo.

[73] Assignee: Petrolite Corporation, St. Louis, Mo.

[21] Appl. No.: 125,726

[22] Filed: Feb. 28, 1980

[51] Int. Cl.³ .......................... C09K 3/00; C10L 1/18; C23F 11/12

[52] U.S. Cl. ...................................... 252/396; 44/66; 208/47

[58] Field of Search ............... 252/396; 44/66; 208/47

[56] References Cited

U.S. PATENT DOCUMENTS

| | | | |
|---|---|---|---|
| 2,775,560 | 12/1956 | Lurton | 252/396 |
| 3,117,091 | 1/1964 | Staker | 252/396 |
| 4,153,464 | 5/1979 | Sturwold | 252/396 |
| 4,214,876 | 7/1980 | Garth | 252/396 |
| 4,448,586 | 5/1984 | Weidig | 44/66 X |

*Primary Examiner*—Ben R. Padgett
*Assistant Examiner*—Matthew A. Thexton
*Attorney, Agent, or Firm*—Sidney B. Ring; Leon Zitver

[57] ABSTRACT

This invention relates to a composition comprising:
(1) polymer acids such as dimer or trimer acids and mixtures thereof, and
(2) an alkenyl or alkyl succinic acid or the anhydride thereof, and the weight ratios of (1) to (2) being less than about 3 to 1; and to the use thereof as a corrosion inhibitor.

Preferably the weight ratio of (1) to (2) is about 2 to 1 or less and the polymer acid is predominantly trimer acid.

6 Claims, No Drawings

MIXTURES OF ALKYL AND ALKENYL SUCCINIC ACIDS AND POLYMER ACIDS

This invention relates to mixtures of
(1) Polymer acids such as dimer, trimer, higher acids, etc., or mixtures thereof, and
(2) alkyl or alkenyl succinic acids or the anhydrides thereof, and to uses thereof, particularly as corrosion and rust inhibitors.

In French Pat. No. 2,340,993 filed as No. 7703921 on Feb. 11, 1977 there is described and claimed a composition for inhibiting corrosion containing as % by weight
(a) about 75 to 95% of a polymerized monocarboxylic aliphatic unsaturated acid having 16 to 18 carbons per molecule and
(b) about 25 to 5% of a monoalkenyl succinic acid having an alkenyl group of 8 to 18 carbons.

Thus, the ratio of polymeric acid to alkenyl succinic acid (ASAA) is about 3 to 1 to 19 to 1 in the French Patent.

We have now discovered that ratios outside this range are effective as corrosion inhibitors. For example we have discovered that polymer acid/ASAA ratios of less than about 3 to 1, preferably less than about 2 to 1, are effective as corrosion inhibitors. In fact, ratios of about 1 to 1 or less have been found to be effective corrosion inhibitors. We have also discovered that improved corrosion inhibition is obtained where the polymer acids are predominantly trimer.

Any alkenyl succinic acid anhydride or the corresponding acid is utilizable in the present invention. The general structural formulae of these compounds are:

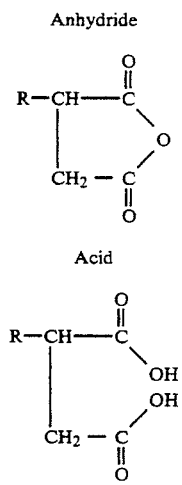

Anhydride

Acid wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkeny radical, but there is no real upper limit to the number of carbon atoms therein. However, it is preferred to use an alkenyl succinic acid anhydride reactant having between about 8 and about 18 carbon atoms per alkenyl radical. In order to produce the reaction products of this invention, however, an alkenyl succinic acid anhydride or the corresponding acid must be used. Succinic acid anhydride and succinic acid are not utilizable herein. For example, the reaction product produced by reacting with succinic acid anhydride is unsatisfactory. Although their use is less desirable, the alkenyl succinic acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride" is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethenyl succinic acid anhydrides; ethenyl succinic acid; ethyl succinic acid anhydride; propenyl succinic acid anhydride; sulfurized propenyl succinic acid anhydride; butenyl succinic acid; 2-methyl-butenyl succinic acid anhydride; 1,2-dichloropentyl succinic acid anhydride; hexenyl succinic acid anhydride; hexyl succinic acid; sulfurized 3-methylpentenyl succinic acid anhydride; 2,3-dimethylbutenyl succinic acid anhydride; 3,3-dimethylbutenyl succinic acid; 1,2-dibromo-2-ethylbutyl succinic acid; heptenyl succinic acid anhydride; 1,2-didooctyl succinic acid; octenyl succinic acid anhydride; 2-methylheptenyl succinic acid anhydride; 4-ethylhexenyl succinic acid; 2-isopropylpentyl succinic acid anhydride; nonenyl succinic acid anhydride; 2-propylhexenyl succinic acid anhydride; decenyl succinic acid; decenyl succinic acid anhydride; 5-methyl-2-isopropylhexenyl succinic acid anhydride; 1,2-dibromo-2-ethyloctenyl succinic acid anhydride; decyl succinic acid anhydride; undecenyl succinic acid anhydride; 1,2-dichloro-undecyl succinic acid; 3-ethyl-2-t-butylpentenyl succinic acid anhydride; dodecenyl succinic acid anhydride; dodecenyl succinic acid; 2-propylnonenyl succinic acid anhydride; 3-butyloctenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibrom-2-methylpentadecenyl succinic acid anhydride; 8-propylpentadecyl succinic acid anhydride; eicosenyl succinic acid anhydride; 1,2-dichloro-2-methylnona decenyl succinic acid anhydride; 2-octyldodecenyl succinic acid; 1,2-diiodotetracosenyl succinic acid anhydride; hexacosenyl succinic acid, hexacosenyl succinic acid anhydride; and hentriacontenyl succinic acid anhydride.

The methods are well know to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relating pure anhydrides, are utilizable herein. Corresponding alkyl succinic anhydrides can also be employed, i.e., where the alkeny group is saturated in any of the above instances, the preparation of alkyl succinic acids and anhydrides thereof is well known to the art.

Polymer acids are well known. Heating aliphatic unsaturated acids such as linoleic acid or similar acids in the absence of a catalyst or in the presence of a catalyst such as clay produces low polymers consisting predominantly of dimer, trimer, and tetramer acids. Variation of the starting materials and of the conditions under which the reaction is carried out will alter the ratio of the various polymers to each other but conditions have not been reported which lead to dimers exclusively.

The first reaction is believed to be the isomerization of the polyunsaturated acid to a conjugated acid which then undergoes a Diels-Alder-type addition with a double bond in a second molecule. The reaction may be depicted as follows:

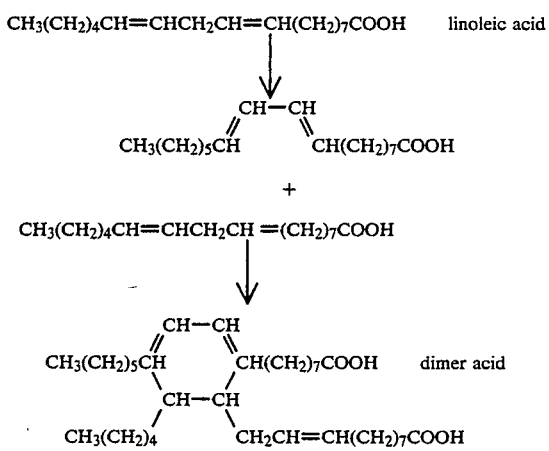

The polymer acids may be represented by the formula

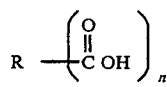

where R is the addition moiety and n=2 to 4 or more, but preferably 2 to 3.

The aliphatic unsaturated carboxylic acids which are polymerized have about 16 to 18 carbons. Examples of such acids include linoleic acid, Tall oil fatty acids, etc. Commercial Polymeric acid contains dimers, trimers and higher polymers, for example from about 40 to 95% by weight of dimers and from about 5 to 25% by weight of trimers.

Commercial Polymeric acids may also contain high ratios of Trimer Acid.

Examples of polymer acids are disclosed in the above French Pat. No. 2,340,993 which is by reference incorporated herein as if part hereof. Polymeric fatty acids are sold by Emery Industries under the "Empol" trademark and Arizona Chemical Company under the "Acintol" trademark.

We have discovered that best corrosion inhibition is achieved where the polymer acid is predominantly trimer acid, i.e., where the polymer acid has greater than about 50% by weight of trimer acid, such as from about 50 to 100% trimer, for example greater than about 60%, but preferably greater than about 75% trimer acid.

The compositions of this invention which are soluble or dispersible therein are particularly useful as rust or corrosion inhibitors such as in refined petroleum products such as in refined mineral oils, gasoline, aviation gasoline, jet fuels, turbine oils, fuel oils, etc.

They may be employed in any amount capable of inhibiting rust or corrosion, such as in minor amounts of at least 0.5 ppm, such as at least 1–5 ppm, for example 15 to 200 ppm, or more, but preferably 25–50 ppm. They are particularly effective in inhibition of rust and corrosion in refined petroleum products, such as petroleum distillates in contact with metals such as ferrous or other metal surfaces.

In certain instances, it may be desirable to add larger amounts of the compositions of the invention, such as up to about 100,000 ppm or greater, for example from about 20 to 1,000 ppm. For example with lubricating oils about 500 to 1,000 ppm or greater amounts are added. With heavy duty lube oil sometimes about 60,000 to 100,000 ppm (i.e., about 6–10%) is sometimes added.

We have found mixtures of the above to be effective in eliminating or reducing rust formed by petroleum products in pipelines. The above compounds have been tested by the National Association of Corrosion Engineer's NACE TM 01-72 test method and have shown the following results.

The following examples are presented by way of illustration and not of limitation.

The ratings of the test are as follows.

| Rating | Proportion of Test Surface Rusted |
|--------|-----------------------------------|
| A | None |
| B++ | Less than 0.1% (2 or 3 spots of no more than 1 mm diameter) |
| B+ | Less than 5% |
| B | 5 to 25% |
| C | 25 to 50% |
| D | 50 to 75% |
| E | 75 to 100% |

In the following table a solution of the compositions of this invention are added as indicated. The concentration in ppm in the Table is the ppm of this solution added to the fuel indicated. TPSA is tetrapropenyl succinic acid.

TABLE 1

| | | | Fuel - Isooctane | | | | | |
|---|---|---|---|---|---|---|---|---|
| | | | | Solution | | | | |
| Ex. | Additive | Solution conc., ppm | % TPSA | % Monomer Acid | % Dimer Acid | % Trimer Acid | % Solvent | Ratings |
| 1 | none | — | — | — | — | — | — | C |
| 2 | no polymer acid | 3 | 15 | 0 | 0 | 0 | 85 | B+ |
| 3 | Composition of invention | 3 | 15 | 2.4 | 27.6 | 0 | 55 | B++ |
| 4 | Composition of invention | 3 | 15 | 1.6 | 18.4 | 0 | 65 | B++ |
| 5 | Composition of invention | 3 | 15 | 0.8 | 9.2 | 0 | 75 | B+ |

TABLE 1-continued

Fuel - Isooctane

| Ex. | Additive | Solution conc., ppm | Solution % TPSA | % Monomer Acid | % Dimer Acid | % Trimer Acid | % Solvent | Ratings |
|---|---|---|---|---|---|---|---|---|
| 6 | Composition of invention | 3 | 15 | 0 | 6 | 24 | 55 | A |
| 7 | Composition of invention | 3 | 15 | 0 | 4 | 16 | 65 | A |
| 8 | Composition of invention | 3 | 15 | 0 | 2 | 8 | 75 | A |
| 9 | Best Commercial Additive | 3 | — | — | — | — | — | A |

TABLE 2

Fuel - Gasoline

| Ex. | Additive | Solution conc., ppm | Solution % TPSA | % Monomer Acid | % Dimer Acid | % Trimer Acid | % Solvent | Ratings |
|---|---|---|---|---|---|---|---|---|
| 1 | none | — | — | — | — | — | — | E |
| 2 | no polymer acid | 6 | 15 | 0 | 0 | 0 | 85 | B+ |
| 3 | Composition of invention | 6 | 15 | 2.4 | 27.6 | 0 | 55 | B++ |
| 4 | Composition of invention | 6 | 15 | 1.6 | 18.4 | 0 | 65 | B+ |
| 5 | Composition of invention | 6 | 15 | 0.8 | 9.2 | 0 | 75 | B+ |
| 6 | Composition of invention | 6 | 15 | 0 | 6 | 24 | 55 | A |
| 7 | Composition of invention | 6 | 15 | 0 | 4 | 16 | 65 | A |
| 8 | Composition of invention | 6 | 15 | 0 | 2 | 8 | 75 | B++ |
| 9 | Best Commercial Additive | 6 | — | — | 0 | — | — | A |

TABLE 3

2 Fuel

| Ex. | Additive | Solution conc., ppm | Solution % TPSA | % Monomer Acid | % Dimer Acid | % Trimer Acid | % Solvent | Ratings |
|---|---|---|---|---|---|---|---|---|
| 1 | none | — | — | — | — | — | — | C |
| 2 | no polymer acid | 6 | 15 | 0 | 0 | 0 | 85 | B+ |
| 3 | Composition of invention | 6 | 15 | 2.4 | 27.6 | 0 | 55 | B+ |
| 4 | Composition of invention | 6 | 15 | 1.6 | 18.4 | 0 | 65 | B+ |
| 5 | Composition of invention | 6 | 15 | 0.8 | 9.2 | 0 | 75 | B+ |
| 6 | Composition of invention | 6 | 15 | 0 | 6 | 24 | 55 | A |
| 7 | Composition of invention | 6 | 15 | 0 | 4 | 16 | 65 | A |
| 8 | Composition of invention | 6 | 15 | 0 | 2 | 8 | 75 | A |
| 9 | Best Commercial Additive | 6 | — | — | — | — | — | B+ |

We claim:

1. A composition comprising
   (1) predominately trimer polymer acid, and
   (2) an alkenyl or alkyl succinic acid or the anhydride thereof, the weight ratio of (1) to (2) being about 2 to 1 or less.

2. The composition of claim 1 where the alkyl or alkenyl group has 8 to 18 carbons.

3. The composition of claim 2 where the alkenyl succinic anhydride is tetrapropenyl succinic acid or the anhydride thereof.

4. A process of inhibiting corrosion which comprises treating a system with the composition of claim 1.

5. A process of inhibiting corrosion which comprises treating a system with the composition of claim 2.

6. A process of inhibiting corrosion which comprises treating a system with the composition of claim 3.